United States Patent [19]

Ikari

[11] Patent Number: 5,644,433
[45] Date of Patent: Jul. 1, 1997

[54] ZOOM LENS SYSTEM

[75] Inventor: Kazuo Ikari, Saitama, Japan

[73] Assignee: Fuji Photo Film Co., Ltd., Kanagawa, Japan

[21] Appl. No.: 628,160

[22] Filed: Apr. 5, 1996

[30] Foreign Application Priority Data

Apr. 5, 1995 [JP] Japan .................. 7-080541

[51] Int. Cl.$^6$ .................. G02B 15/14
[52] U.S. Cl. .................. 359/687; 359/684
[58] Field of Search .................. 359/687, 684

[56] References Cited

U.S. PATENT DOCUMENTS 4,789,227 12/1988 Tanaka et al. .................. 359/684
4,842,385 6/1989 Tanaka .................. 359/683
5,168,402 12/1992 Mihara .................. 359/684

Primary Examiner—Georgia Y. Epps
Assistant Examiner—John P. Cornely

[57] ABSTRACT

A zoom lens system is composed of a first lens group of a positive power, a second lens group of a negative power, a third lens group of a positive power, and a fourth lens groups of a positive power arranged in this order from the object side, the magnification of said zoom lens system being changed by moving the second and third lens groups relative to each other and to the first and fourth lens groups while the positions of the first and fourth lens groups are fixed, wherein focal lengths of the first to fourth lens groups are defined to satisfy the following conditions:

$$100 < f1/fw < 500$$

$$2.3 < |f2|/fw < 3.5$$

$$1 < f4/f3 < 2$$

wherein f1, f2, f3 and f4 are the focal lengths of the first to fourth lens groups, respectively; and fw is the focal length of the zoom lens system in a wide-angle terminal.

3 Claims, 6 Drawing Sheets

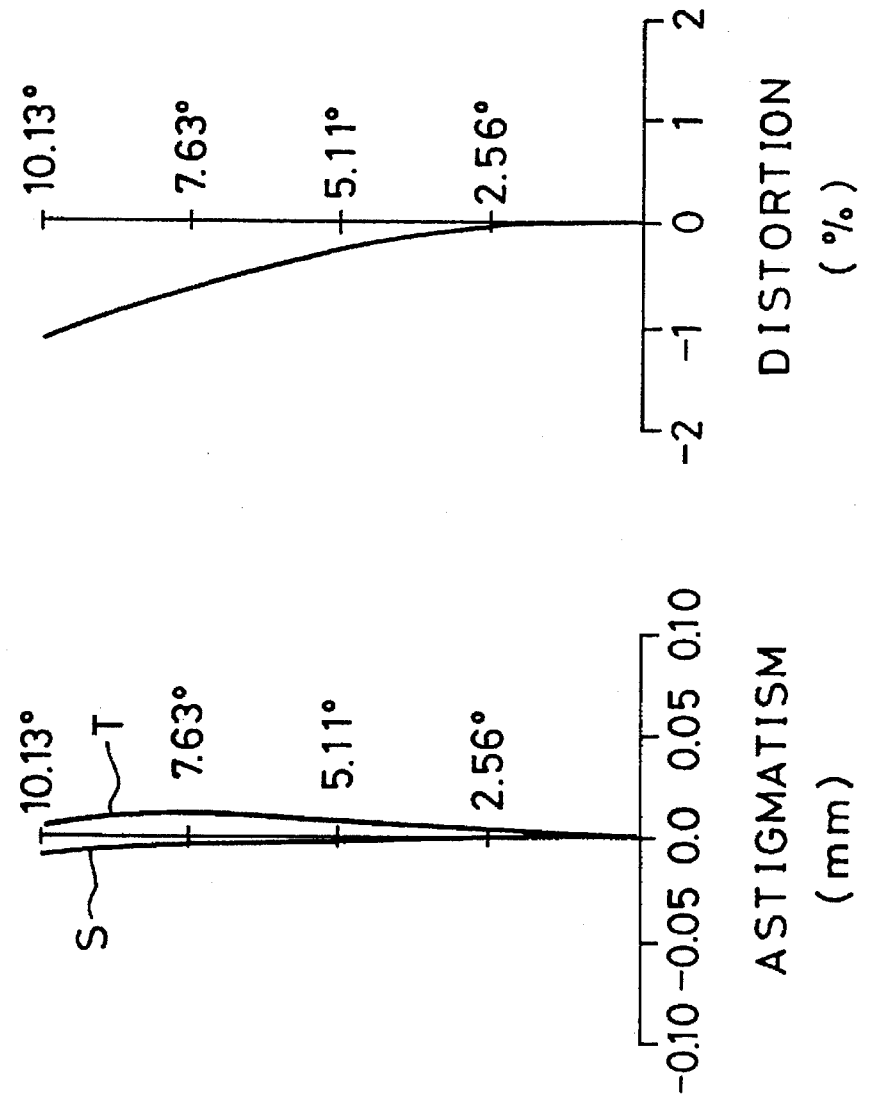

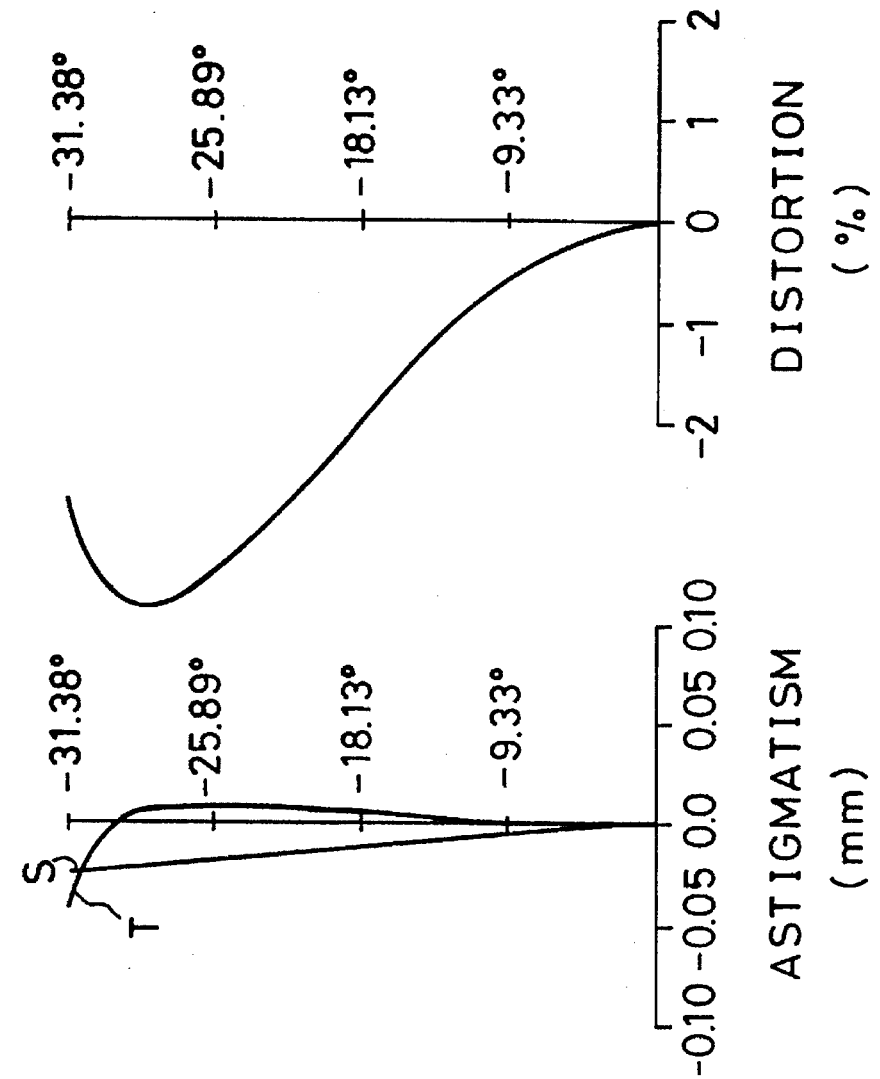
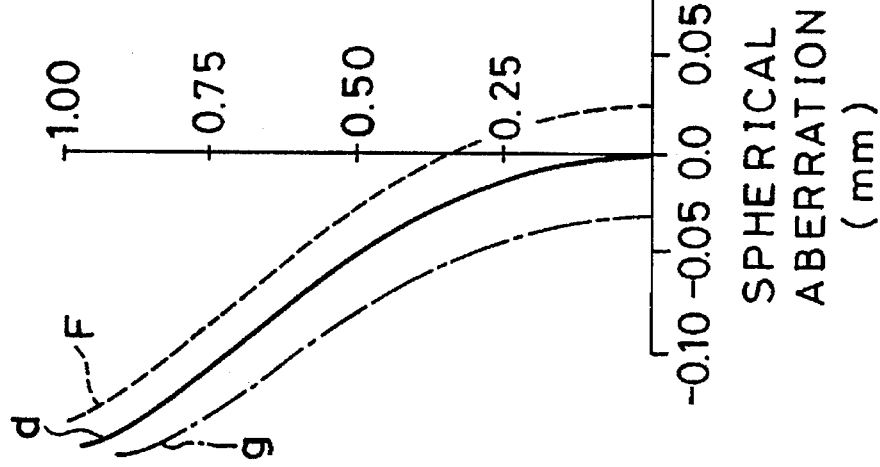

ZOOM LENS SYSTEM

BACKGROUND OF THE INVENTION

1. Field of the Invention

The present invention relates to a zoom lens system, particularly to a zoom lens suitable for forming an image of an object located at very close range onto an imaging device, such as a CCD.

2. Description of the Prior Art

A picture input device has been developed by the present applicant, which has a lens system for forming an image of a picture, e.g., a photographic picture on a negative or positive film or a photo-print, onto an imaging device such as a CCD, so as to output a photoelectric image signal to a video device, e.g., a video recorder, a video printer, a CRT display device, a personal computer etc. The picture input device, named "FUJIX PHOTOVISION FV7" (a trademark), for instance, makes it possible to utilize photographs in various ways in connection with various video devices at hand, and thus widens the pleasure of photography.

The picture input device is made compact, and a picture to be imaged, especially a photographic picture, is set at very close range, i.e. 10 mm to 20 mm, from the lens system of the picture input device. In order to permit imaging a partial area of the picture at variable magnification, it is desirable to use a zoom lens system as the lens system of the picture input device. The zoom lens system of the picture input device should work sufficiently for a subject in the very close range of 10–20 mm.

In general, however, increasing the zoom ratio of a zoom lens increases fluctuation of various aberrations and makes it difficult to maintain a good balance of various aberrations. Especially where a subject is to be imaged at very close range, like in the picture input device, astigmatism becomes too great to control, so that the image formed on the imaging device is inevitably deteriorated. Therefore, the zoom ratio has conventionally been limited to 2 or less for a taking lens of the imaging device.

OBJECT OF THE INVENTION

An object of the present invention is to provide a zoom lens system having a large zoom ratio, of which various aberrations are restrained small even for a subject at very close range.

DETAILED DESCRIPTION OF THE INVENTION

According to the present invention, a zoom lens system is composed of a first lens group of a positive power, a second lens group of a negative power, a third lens group of a positive power, and a fourth lens groups of a positive power arranged in this order from the object side, and the magnification of the zoom lens system is changed by moving the second and third lens groups relative to each other and to the first and fourth lens groups while the positions of the first and fourth lens groups are fixed. The focal lengths of the first to fourth lens groups are defined to satisfy the following conditions:

$$100 < f1/fw < 500 \quad (1)$$

$$2.3 < |f2|/fw < 3.5 \quad (2)$$

$$1 < f4/f3 < 2 \quad (3)$$

wherein f1, f2, f3 and f4 are the focal lengths of the first to fourth lens groups, respectively; and fw is the focal length of the zoom lens system in a wide-angle terminal.

According to a preferred embodiment, focusing is performed by moving the second lens group.

It is preferable to set the refractive index of the second lens group and that of the third lens group to satisfy the following conditions:

$$1.7 < Nd2 \quad (4)$$

$$1.7 < Nd3 \quad (5)$$

According to the present invention, giving the positive refracting power to the first lens group positioned nearest to the subject restrains the increase of spherical aberration and distortion and the change in curvature of the field as well.

The fluctuation of various aberrations upon focusing is reduced so that a good balance of aberrations and good optical properties can be obtained by fixing the position of the first lens group and configuring it to satisfy the condition (1).

If the value f1/fw is not less than 500, the fluctuation of spherical aberration upon focusing on the subject could not be restrained, so that effect of correcting distortion would be reduced. If the value f1/fw is not more than 100, the refracting power of the first lens group and hence the fluctuation of various aberrations of the first lens group would be too great to maintain a proper balance of aberrations.

It is possible to shorten the overall length of the zoom lens system by setting the value |f2|/fw in the following range:

$$2.3 < |f2|/fw < 3.5 \quad (2)$$

If the value |f2|/fw is not less than 3.5, the refracting power of the second lens group could not be sufficient so that the second lens group needs to move a longer distance on focusing and have a larger diameter. In result, the overall lens system would be enlarged. Shortening the overall length with the value |f2|/fw of 3.5 or more would make it hard for the third lens group to limit the fluctuation of various aberrations upon zooming. If the value |f2|/fw is not more than 2.3, it would be easier to shorten the overall length, but the refracting power of the second lens group would become too great to limit the fluctuation of spherical aberration and the deterioration of curvature of the field, so that distortion would be increased.

It is possible to obtain a desirable zooming effect while keeping the exit pupil sufficiently away from the image forming position by setting the value f4/f3 in the following range:

$$1 < f4/f3 < 2 \quad (3)$$

If the value f4/f3 is not less than 2, the exit pupil would be so close to the image forming position that the light from the subject would fall diagonally onto the imaging device, resulting in shading. If the value f4/f3 is not more than 1, the refracting power of the third lens would be reduced so that the zooming effect would become so small that it would be necessary to elongate the overall length of the lens system in order obtain the desirable zooming ratio.

It is possible to prevent the Petzval sum from being too small by composing the second and third lens groups to satisfy the condition:

$$1.7 < Nd2 \quad (4)$$

$1.7 < Nd3$ (5)

Thereby, it is possible to maintain the balance of various aberrations in a proper condition while the overall length of the zoom lens system is maintained shortened. If the refractive index Nd2 of the second lens group is not more than 1.7, curvature of the field would be increased too much. If the refractive index Nd3 of the third lens group is not more than 1.7, the fluctuation of spherical aberration would become too great to limit.

BRIEF DESCRIPTION OF THE DRAWINGS

The present invention will now be described in detail with respect to preferred embodiments with reference to the accompanying drawings, wherein like reference numerals designates like or corresponding parts throughout the several views, and wherein:

FIGS. 3A, 3B and 3C are diagrams showing various aberrations of Example 1 in the telephoto terminal;

FIGS. 5A, 5B and 5C are diagrams showing various aberrations of the lens system of Example 2 in the wide-angle terminal.

Figure 1A:
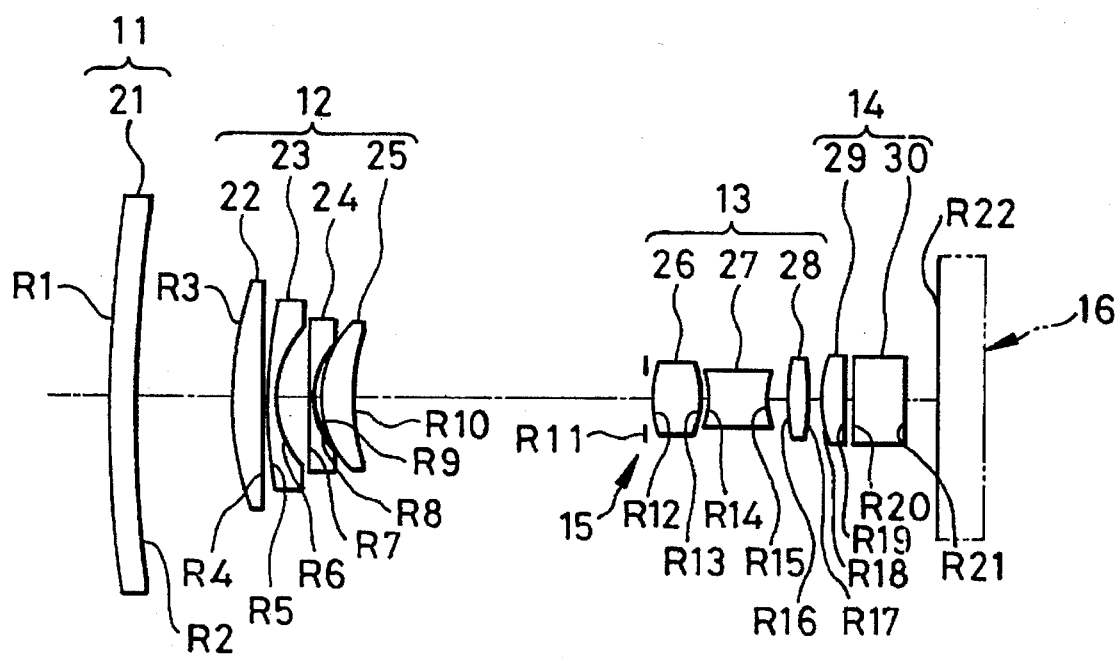
FIGS. 1A and 1B are schematic diagrams showing a lens system according to Example 1 of the present invention, in the wide-angle terminal and in the telephoto terminal respectively.

In the drawings, Ri is the radius of curvature of the i-th lens surface, and Di is the thickness of the i-th lens element or the air space between the adjacent lens elements.

DETAILED DESCRIPTION OF THE PREFERRED EMBODIMENTS

Figure 1B:
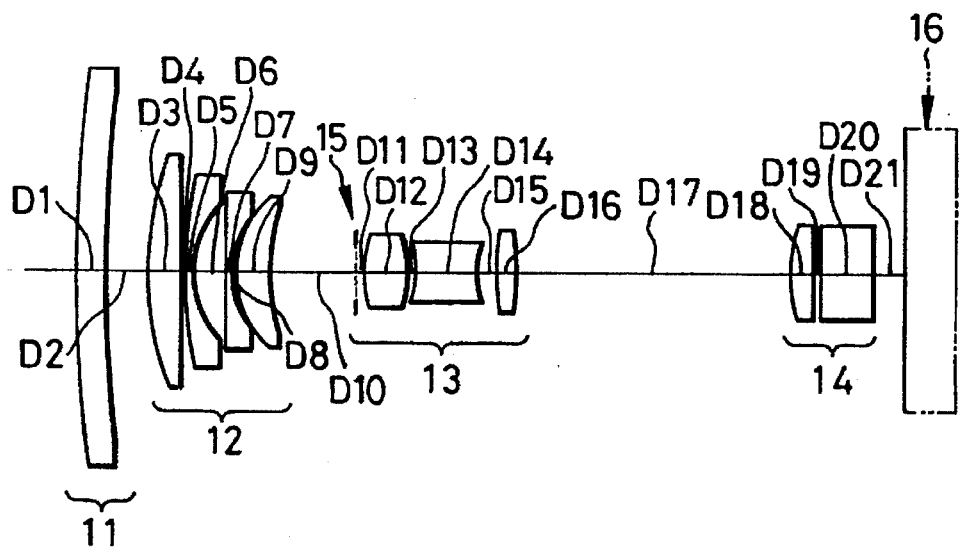

The zoom lens system of the first Example of the present invention, as shown in FIGS. 1A and 1B, is composed of a first lens group 11, a second lens group 12, a third lens group 13, a fourth lens group 14 and a stop 15 disposed between the second and third lens groups 12 and 13. The first lens group 11 is composed of a single convex lens 21 of a positive power. The second lens group 12 is composed of four lens elements 22 to 25 and has a negative power as a whole. The third lens group 13 is composed of three lens elements 26 to 28 and has a positive power as a whole. The fourth lens group 14 is composed of a convex lens 29 and a parallel glass 30 which serves as an optical low-pass filter, and has a positive power as a whole.

The positions of the first and fourth lens groups 11 and 14 are fixed. Upon zooming from a shorter focal length to a longer focal length, the second and third lens groups 12 and 13 are moved toward the object side while the spacing between these two lens groups being changed. The zoom lens system of the first Example is designed to obtain a zoom ratio of about 4.

Numerical values for the first Example will be described below.

In the numerical values that follow, R is the radius of curvature of the respective surfaces of the lens elements 21 to 30 and those of the stop 15 and an image forming surface of an imaging device 16 (Ri is the radius of curvature of the i-th surface in the order from the object side), D (=Di) the spacing between two adjacent surfaces, Nd the refractive index, and νd the Abbe number, f the focal length (mm), and Fno the f-number. The numbers in the first column designate the surface number.

EXAMPLE 1 f = 3.79 to 14.30 mm
Fno = 2.68 to 5.67
Subject distance = 18.6 mm

| i | R (mm) | D (mm) | Nd | νd |
| --- | --- | --- | --- | --- |
| 1 | 100.00000 | 2.200000 | 1.492000 | 57.5000 |
| 2 | 124.00000 | 7.301–3.398 | | |
| 3 | 25.87554 | 2.353328 | 1.847000 | 23.8000 |
| 4 | 200.36274 | 0.200000 | | |
| 5 | 28.98901 | 0.700000 | 1.833895 | 43.0939 |
| 6 | 7.76657 | 2.112891 | | |
| 7 | 54.86950 | 0.700000 | 1.817417 | 44.5770 |
| 8 | 7.58091 | 0.605597 | | |
| 9 | 7.52511 | 2.192843 | 1.847000 | 23.8000 |
| 10 | 12.39245 | 21.956–6.763 | | |
| 11 | ∞ | 0.500000 | | |
| 12 | 6.58226 | 3.600824 | 1.807472 | 45.5542 |
| 13 | −14.58019 | 0.292686 | | |
| 14 | −8.40297 | 4.474172 | 1.755798 | 27.0101 |
| 15 | 4.90078 | 1.428274 | | |
| 16 | 9.54625 | 1.695921 | 1.831278 | 42.0646 |
| 17 | −21.37144 | 1.049–20.145 | | |
| 18 | 8.94746 | 1.688614 | 1.516000 | 64.2000 |
| 19 | 111.46536 | 0.600074 | | |
| 20 | ∞ | 3.900000 | 1.516000 | 64.2000 |
| 21 | ∞ | 2.337806 | | |
| 22 | ∞ | 0 | | |

Characteristic values of the zoom lens system of Example 1 are as follows:

f1=1015.850
f2=−10.881
f3=12.472
f4=18.650
f1/fw=268.0343
|f2|/fw=2.8709762
f4/f3=1.4953495
Nd2=1.836328
Nd3=1.7981826 wherein f1 to f4 are the focal lengths of the first to fourth lens groups 11 to 14, respectively; and fw is the focal length of the zoom lens system in a wide-angle terminal and Nd2 and Nd3 are the respective refractive indices of the second and third lens group. As is evidenced from the elements shown in Example 1, a group refractive index is simply the average of the refractive indices of the constituent components thereof.

Accordingly, the characteristic values of Example 1 satisfy the following conditions:

$100 < f1/fw < 500$ (1)

$2.3 < |f2|/fw < 3.5$ (2)

$1 < f4/f3 < 2$ (3)

$1.7 < Nd2$ (4)

$1.7 < Nd3$ (5)

Figure 2C:
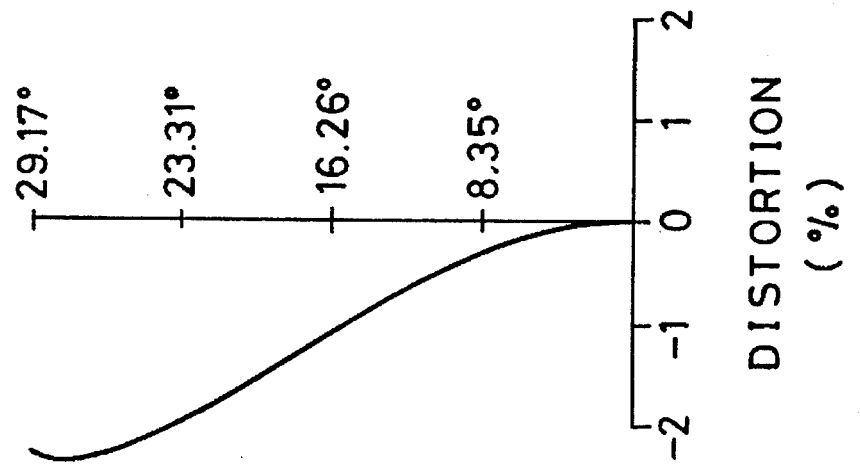
FIGS. 2A, 2B and 2C are diagrams showing various aberrations of the lens system of Example 1 in the wide-angle terminal.
Figure 2B:
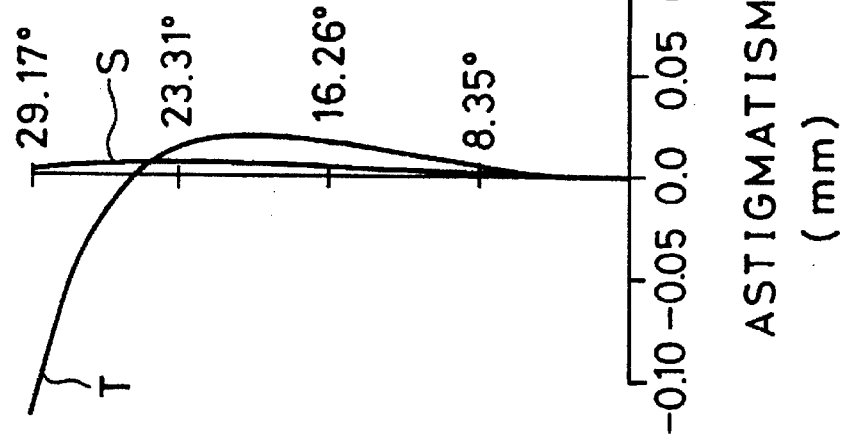
Figure 2A:
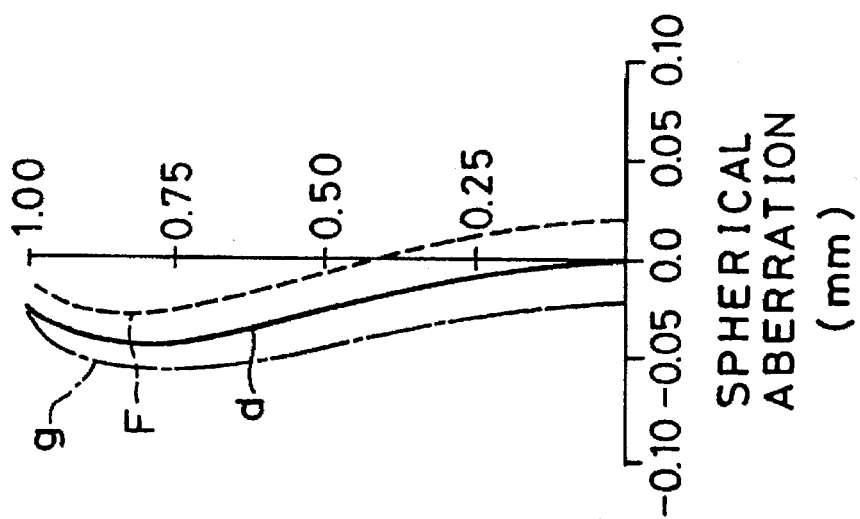

The spherical aberration, astigmatism and distortion of Example 1 are illustrated in FIGS. 2A, 2B and 2C with respect to the wide-angle terminal (f=3.79 mm), and in FIGS. 3A, 3B and 3C with respect to the telephoto terminal (f=14.30 mm), respectively. In the diagrams, "g", "d" and "F" represent curves of spherical aberration with respect to g-line (460.0 nm), d-line (546.1 nm) and F-line (615.0 nm), and "S" and "T" represent sagittal and tangential, respectively.

Figure 4A:
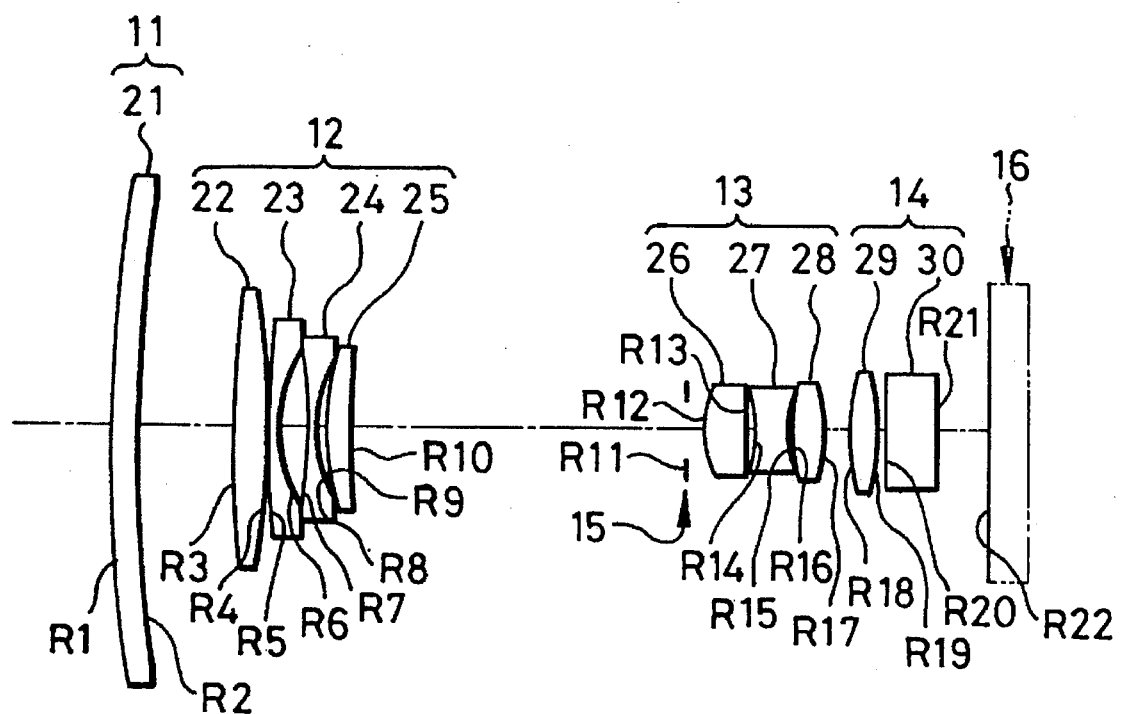
FIGS. 4A and 4B are schematic diagrams showing a lens system according to Example 2 of the present invention, in the wide-angle terminal and in the telephoto terminal respectively.
Figure 4B:
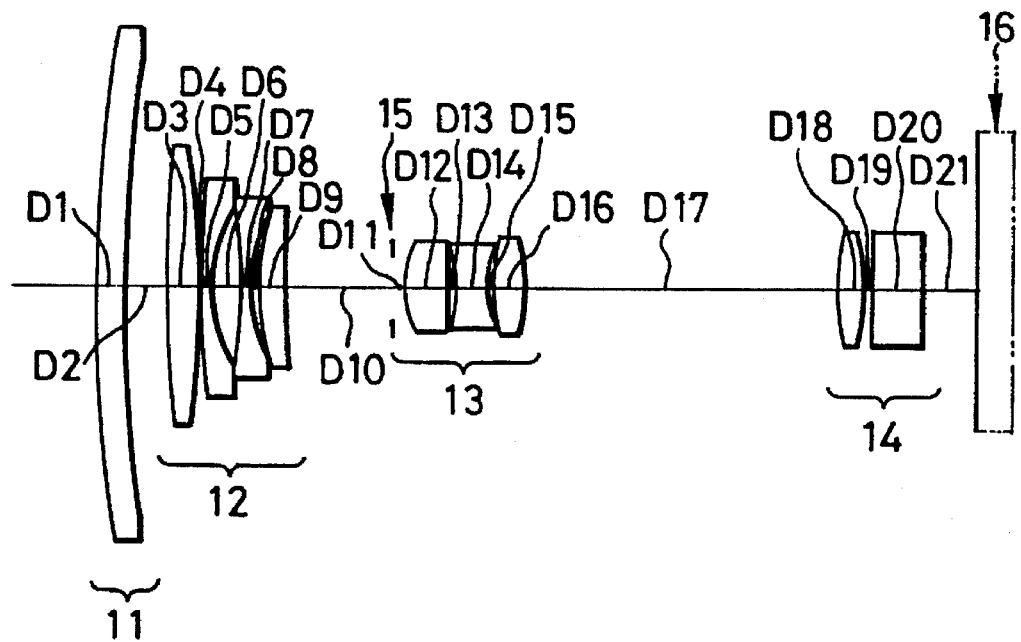
Figures 6A, 6B, 6C:
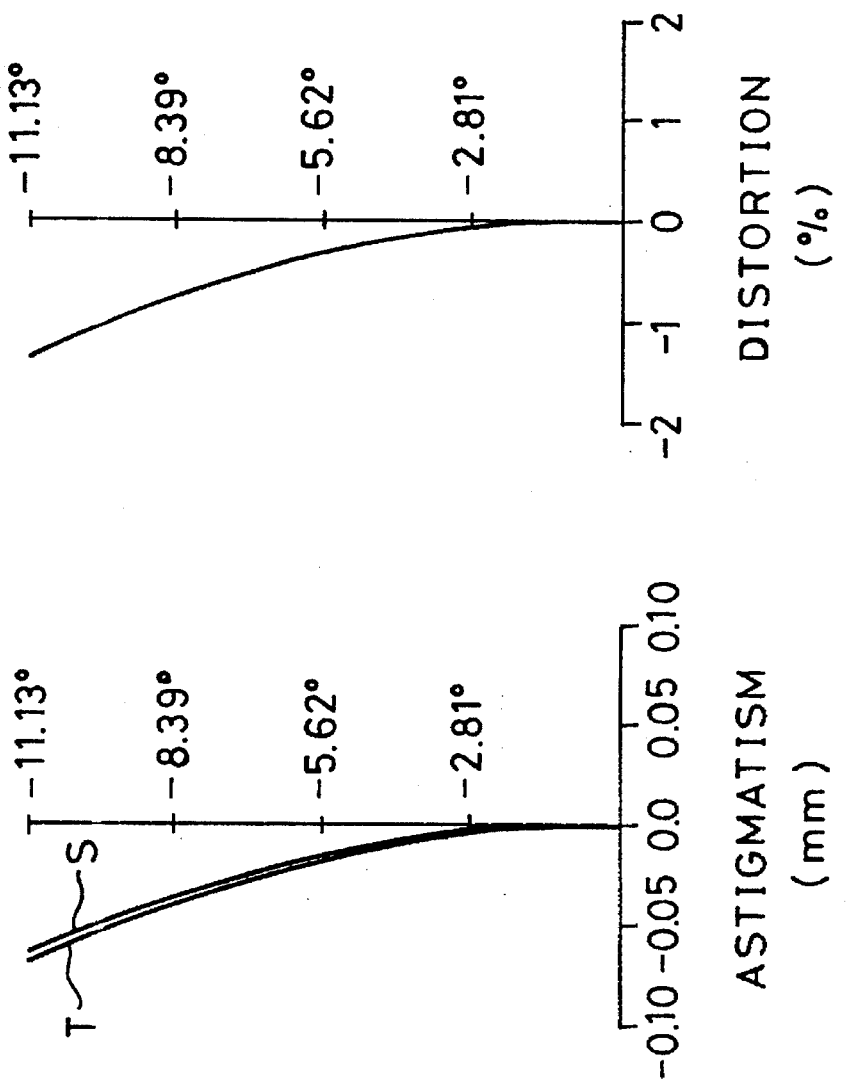
FIGS. 6A, 6B and 6C are diagrams showing various aberrations of Example 2 in the telephoto terminal.

Next, numerical values for the second Example shown in FIGS. 4A and 4B according to the present invention will be described below. Example 2 has substantially equivalent construction to Example 1. The spherical aberration, astigmatism and distortion of Example 2 are illustrated in FIGS. 5A, 5B and 5C with respect to the wide-angle terminal, and in FIGS. 6A, 6B and 6C with respect to the telephoto terminal.

EXAMPLE 2 f = 3.663 to 13.938 mm
Fno = 2.36 to 5.17
Subject distance = 18.6 mm

| i | R (mm) | D (mm) | Nd | νd |
| --- | --- | --- | --- | --- |
| 1 | 100.00000 | 2.200000 | 1.492000 | 57.5000 |
| 2 | 124.00000 | 6.620–2.877 | | |
| 3 | 61.44400 | 2.500000 | 1.847000 | 23.8000 |
| 4 | −61.44400 | 0.150000 | | |
| 5 | 94.05200 | 0.700000 | 1.773000 | 49.6000 |
| 6 | 10.71300 | 2.200000 | | |
| 7 | −35.23400 | 0.700000 | 1.755000 | 52.3000 |
| 8 | 11.98000 | 0.450000 | | |
| 9 | 18.25500 | 1.770000 | 1.847000 | 23.8000 |
| 10 | 75.70000 | 23.636–7.445 | | |
| 11 | ∞ | 0.900000 | | |
| 12 | 6.94600 | 3.230000 | 1.804000 | 46.5000 |
| 13 | −46.40600 | 0.459000 | | |
| 14 | −11.75100 | 2.160000 | 1.755000 | 27.5000 |
| 15 | 6.41700 | 0.451000 | | |
| 16 | 14.67900 | 2.240000 | 1.835000 | 43.0000 |
| 17 | −14.67900 | 1.779–21.713 | | |
| 18 | 13.78300 | 1.830000 | 1.517000 | 64.2000 |
| 19 | −27.44700 | 0.599652 | | |
| 20 | ∞ | 3.700000 | 1.517000 | 64.2000 |
| 21 | ∞ | 3.634938 | | |
| 22 | ∞ | 0 | | |

Characteristic values of the zoom lens system of Example 2 are as follows:

f1=1015.850
f2=−11.802
f3=13.066
f4=17.961
f1/fw=277.32732
f2/fw=3.2219492
f4/f3=1.3746364
Nd2=1.8055
Nd3=1.798 wherein f1 to f4 are the focal lengths of the first to fourth lens groups 11 to 14, respectively; and fw is the focal length of the zoom lens system in a wide-angle terminal; and Nd2 and Nd3 are the respective refractive indices of the second and third lens group. As is evidenced from the elements shown in Example 2, a group refractive index is simply the average of the refractive indices of the constituent components thereof.

Although the present invention has an object to provide a zoom lens system which has a superior optical performance especially for focusing on an object disposed in the very close range, it is obvious for person skilled in the art that the zoom lens system of the present invention is applicable to imaging of a subject in the infinity range solely by elongating the movable distance of the second lens group 12.

What is claimed is:

1. A zoom lens system composed of a first lens group of a positive power, a second lens group of a negative power, a third lens group of a positive power, and a fourth lens groups of a positive power arranged in this order from the object side, the magnification of said zoom lens system being changed by moving the second and third lens groups relative to each other and to the first and fourth lens groups while the positions of the first and fourth lens groups are fixed, wherein focal lengths of the first to fourth lens groups are defined to satisfy the following conditions:

$$100 < f1/fw < 500 \quad (1)$$

$$2.3 < f2/fw < 3.5 \quad (2)$$

$$1 < f4/f3 < 2 \quad (3)$$

wherein f1, f2, f3 and f4 are the focal lengths of the first to fourth lens groups, respectively; and fw is the focal length of the zoom lens system in a wide-angle terminal.

2. The zoom lens system as claimed in claim 1, wherein focusing is performed by moving the second lens group.

3. The zoom lens system as claimed in claim 1, further satisfying the following conditions:

$$1.7 < Nd2 \quad (4)$$

$$1.7 < Nd3 \quad (5)$$

wherein Nd2 is the refractive index of the second lens group, and Nd3 is the refractive index of the third lens group.

* * * * *